March 25, 1930.  P. S. LEGGE  1,751,931
STONE WORKING MACHINE
Filed Aug. 2, 1927  6 Sheets-Sheet 6
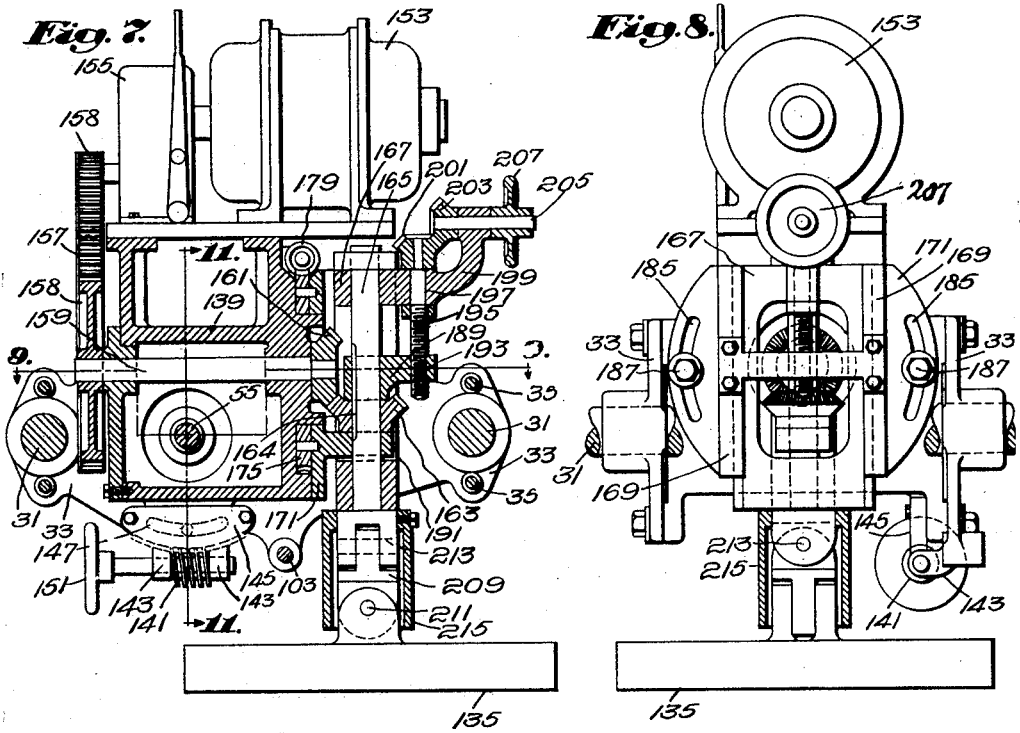
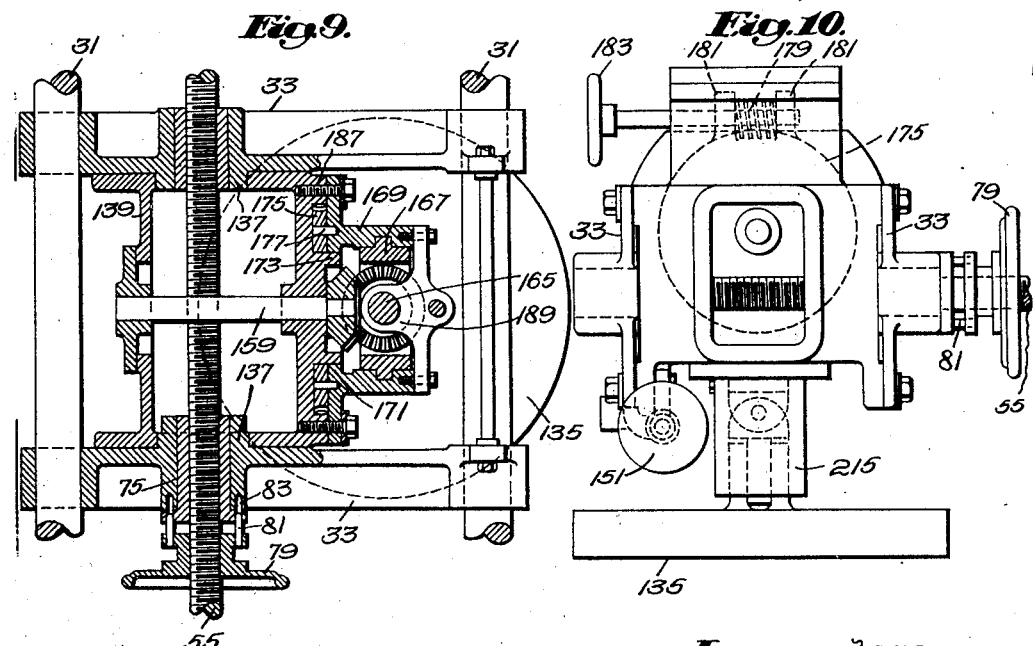
Inventor:
Peter S. Legge Patented Mar. 25, 1930

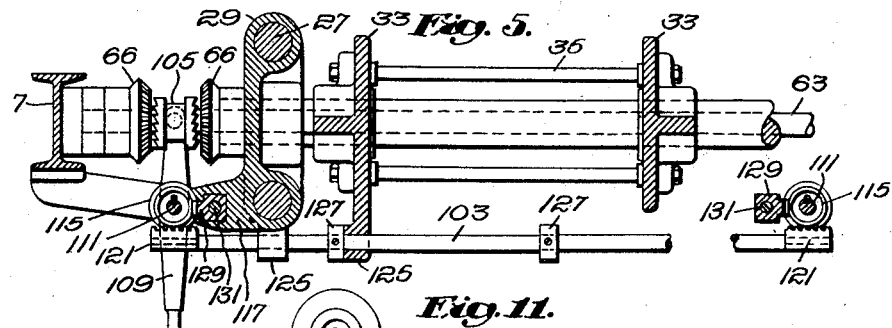

1,751,931

UNITED STATES PATENT OFFICE

PETER S. LEGGE, OF POMPTON LAKES, NEW JERSEY

STONEWORKING MACHINE

Application filed August 2, 1927. Serial No. 210,072.

My invention relates to stone working machinery, and particularly but not exclusively to a machine for polishing blocks of stone.

The invention will be best understood from the following description when read in the light of the accompanying drawings of a specific embodiment of the invention selected for illustrative purposes, while the scope of the invention will be more particularly pointed out in the appended claims.

In the drawings:—

Fig. 5 is a section on the line 5—5 of Fig. 4;

Fig. 6 is a section on the line 6—6 of Fig. 1 showing a detail of the clutch shifting mechanism;

Fig. 7 is a section on the line 7—7 of Fig. 1;

Fig. 8 is an elevation looking at Fig. 7 from the right;

Fig. 9 is a section on the line 9—9 of Fig. 7;

Fig. 10 is an end elevation looking at Fig. 9 from the left, with parts omitted;

Fig. 11 is a section on the line 11—11 of Fig. 7; and

Fig. 12 is a section on the line 12—12 of Fig. 11.

Figure 1:
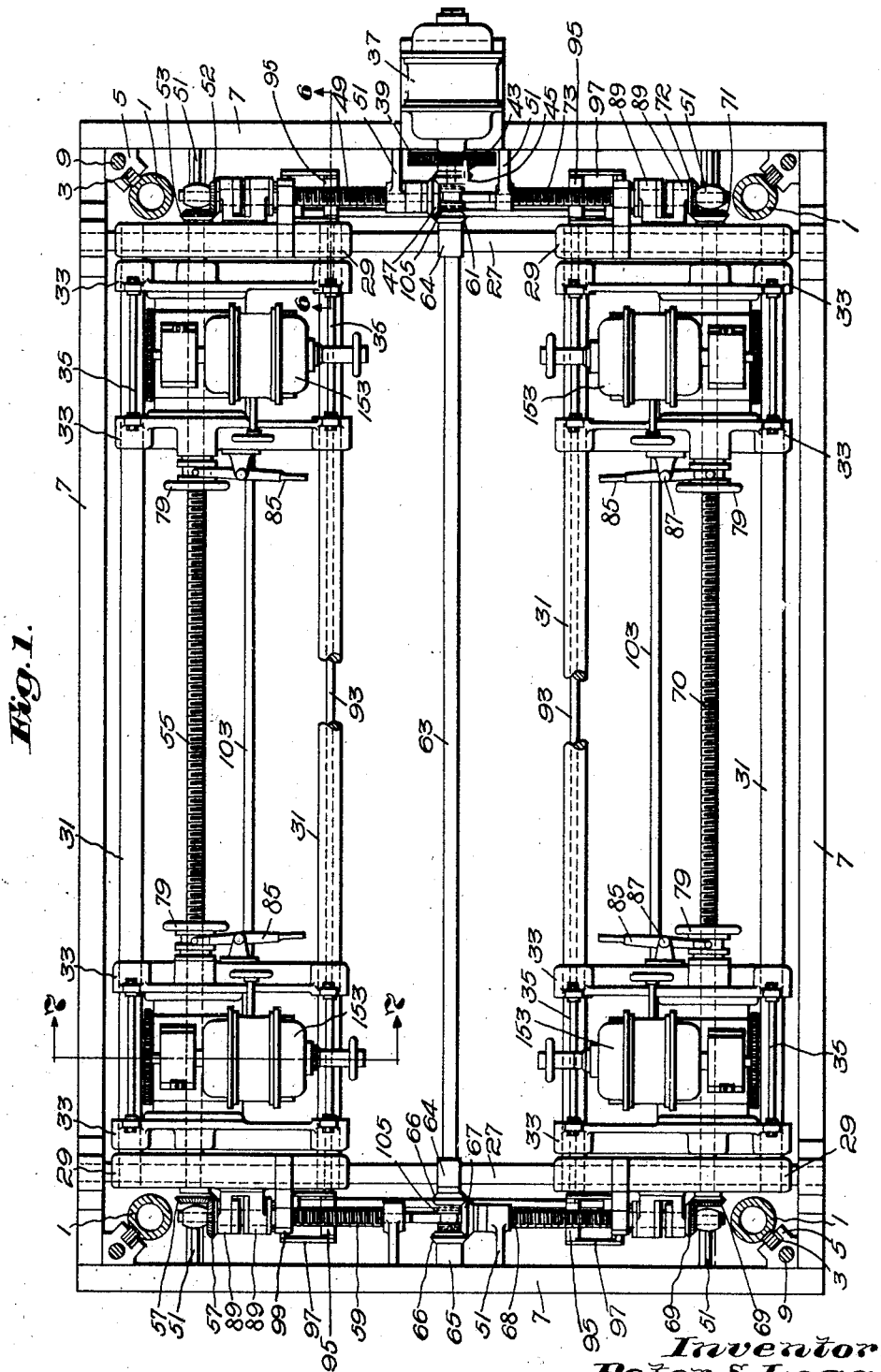
Fig. 1 is a plan of a machine constructed according to the invention, with some parts omitted.

Referring to the drawings I have shown a frame comprising four vertical corner posts 1 (Figs. 1 and 2) each of which carries a vertically disposed guideway 3 on which slides a block 5, the four blocks 5 supporting the longitudinal and transverse side members 7 of a rectangular frame, the latter herein providing the main support for the polishing tools.

Figure 2:
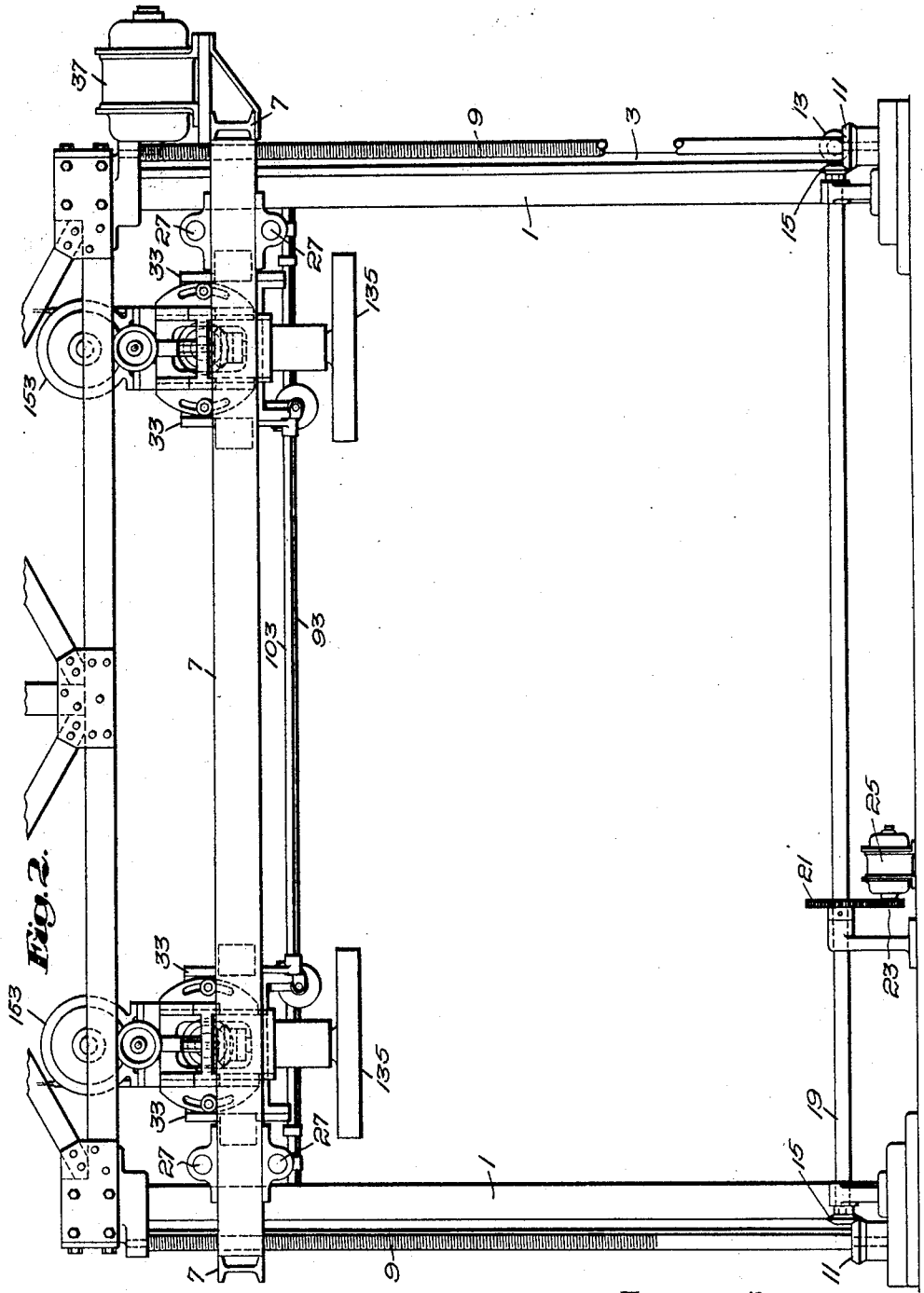
Fig. 2 is a side elevation according to Fig. 1, with parts broken away and parts omitted.
Figure 3:
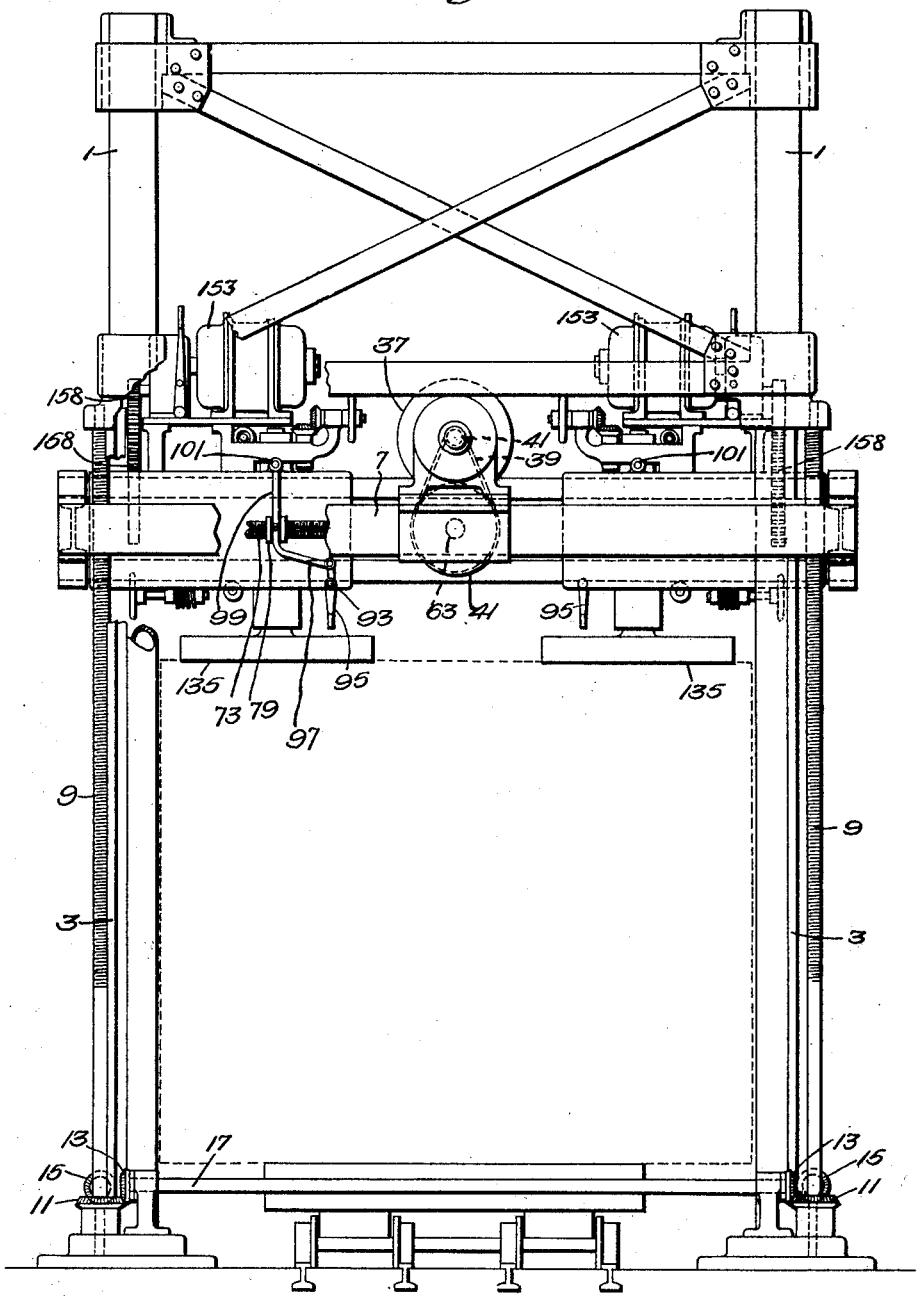
Fig. 3 is an end elevation, with parts broken away, of the machine according to Fig. 1.

Herein for raising and lowering the main support are provided vertically disposed rotatable screws 9 threaded through the blocks 5 so that by giving the screws the proper pitch and direction of rotation the main support may be raised and lowered. As shown (Figs. 2 and 3) each screw 9 at the lower end thereof is provided with a bevel gear 11 which meshes with bevel gears 13 and 15 respectively carried by the transverse lay shaft 17 and longitudinal lay shaft 19 so that all the four screws will be rotated simultaneously. Herein for rotating the shafts one of the lay shafts 19 (Fig. 2) carries a gear 21 meshing with the pinion 23 of the driving motor 25, it thus being observed that power means is provided for raising and lowering the main support.

As illustrated, the longitudinally disposed members 7 of the main support near opposite ends thereof carry upper and lower transverse cylindrical guide bars 27 on which are slidably mounted carriages 29. Supported by the carriages 29 are longitudinally disposed guide bars 31. Slidably mounted on the guide bars 31 are tool-carrying carriages each of which herein comprises a pair of end members 33 secured in fixed spaced relation by spacing bars 35.

Herein for sliding the members 29 on the transversely disposed bars 27, and the members 33 on the longitudinally disposed bars 31, a motor 37 is mounted on the main frame, which motor by means of a chain 39 (Fig. 3) and cooperating sprockets 41 drives a rotatable sleeve 43 (Fig. 4) carrying a bevel gear 45. Meshing with the bevel gear 45 is a bevel gear 47 (Fig. 1) fixed to the end of a screw threaded shaft 49 rotatably supported in brackets 51 carried by the adjacent transverse member 7 of the main frame. At its end opposite the bevel gear 47 the shaft 49 carries a bevel gear 52 meshing with a bevel gear 53 carried on the end of a screw threaded shaft 55, the latter at its end opposite the bevel gear 53 driving by means of cooperating bevel gears 57 a screw threaded shaft 59 similar to the screw threaded shaft 49. In a manner hereinafter described the transversely disposed screw threaded shafts 49 and 59 are utilized to slide the rearmost members 29, as viewed in Fig. 1, on the bars 27, while the screw threaded shaft 55 is utilized to slide the rearward members 33 of that figure on the adjacent longitudinally disposed bars 31.

Herein for sliding the members 29 and 33 at the front of the machine as viewed in Fig. 1 relative to the main frame, the bevel gear 47 meshes with a bevel gear 61 which is carried on the end of a longitudinally disposed shaft 63 rotatably carried by the main frame in brackets 64 supported on the bars 27, and in brackets 65 (Fig. 4) carried by the transverse members 7 of the main support, said shaft at its end opposite the gear 61 carrying bevel gears 66 adapted to drive a meshing bevel gear 67 carried on a transversely disposed screw threaded shaft 68, the latter in its turn by means of cooperating bevel gears 69 driving a longitudinally disposed screw threaded shaft 70 which by means of cooperating bevel gears 71 and 72 drives the transversely disposed screw threaded shaft 73. The bevel gears 45, 61 and 66 are rotatable relative to the shaft 63, and by clutching to said shaft in a manner hereinafter explained either the gear 61 or 45 said shaft may be rotated in either of opposite directions, and similarly by clutching to said shaft one or the other of the two gears 66 the shaft 68 may be rotated in either of opposite directions.

Figure 4:
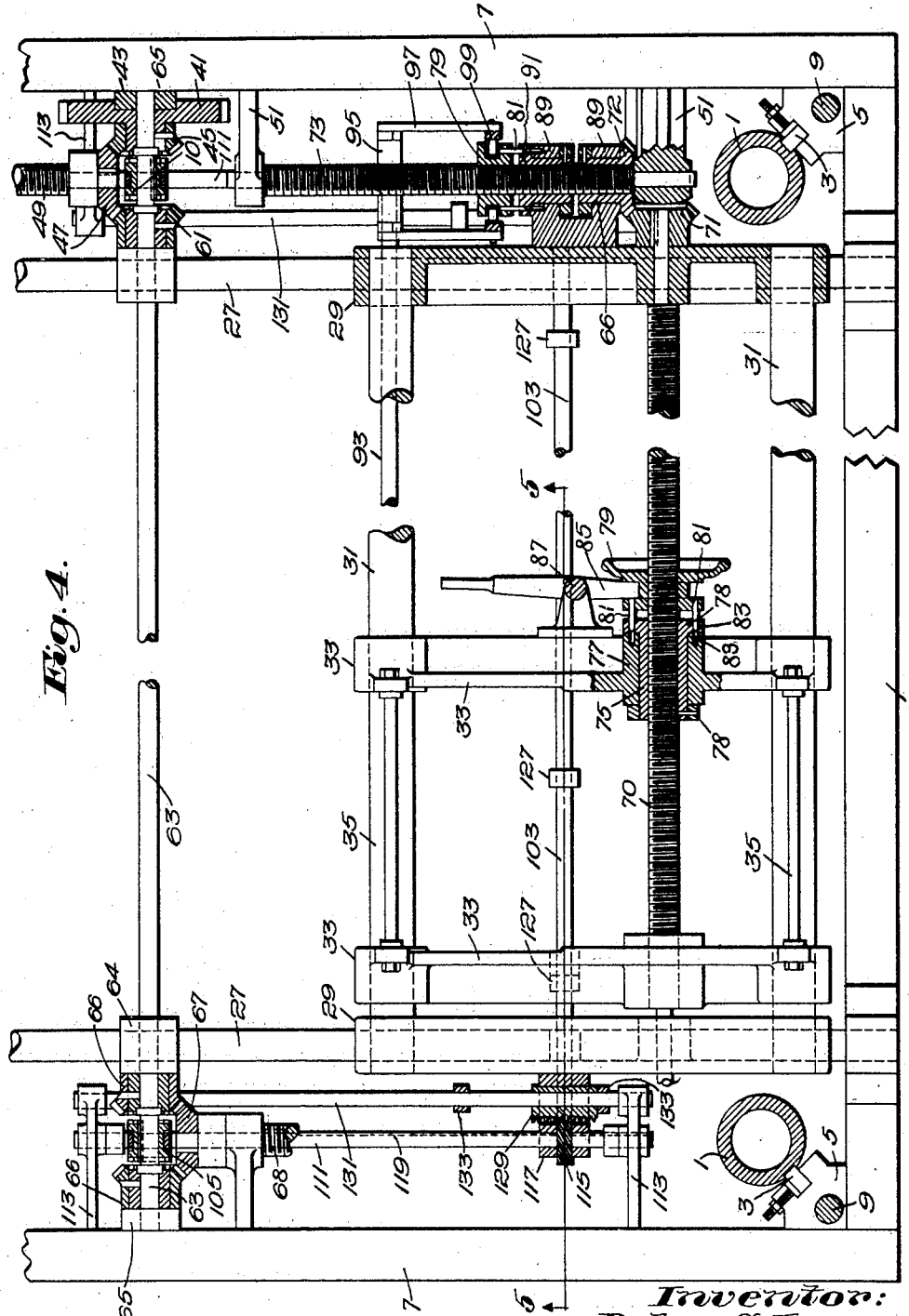
Fig. 4 is a plan according to Fig. 1 on an enlarged scale, with parts omitted.

As best illustrated in Figs. 1 and 4, the longitudinally disposed shafts 55 and 70 extend through the members 33, one of each pair of members as shown by Fig. 4 having a nut 75 cooperating with the corresponding screw threaded shaft. As illustrated, this nut is rotatably mounted in a boss 77 formed integrally with the adjacent member 33, the nut being held against displacement longitudinally of the shaft by the collars 78 carried by the nut at opposite sides of said boss. As shown a handwheel 79 loosely surrounds the screw threaded shaft and carries a plurality of pins 81 slidably mounted in aligned perforations 83 in the nut 75 and boss 77. When the parts are in the position shown by Fig. 4 the nut will rotate with the screw threaded shaft and will not move the members 33. However, with the parts in this position, if the handwheel 79 is turned relative to the shaft, say by rotating it when the shaft is stationary, or by preventing the handwheel from rotating when the shaft is rotating the members 33 will be slid on the bars 31. If the handwheel is pressed toward the nut from the position shown by Fig. 1 to cause the pins to enter the perforations 83 in the boss 77 the nut will be prevented from rotating relative to said boss, which will cause the screw threaded shaft when rotating to move the members 33. Conveniently for operating the clutch formed by the handwheel and pins 81 a lever 85 (Fig. 1) may be provided, which lever is pivoted at 87 to the adjacent member 33, and in a known manner is adapted to move the handwheel axially so as to engage and disengage this clutch.

For sliding the members 29 on the bars 27 each of the four end members, as best shown in Figs. 1 and 4, is provided with a pair of brackets 89 one of which rotatably supports the bevel gear, for example the bevel gear 72 (Fig. 4) which drives the adjacent transverse screw threaded shaft, for example the shaft 73, this gear being splined to said shaft so that the gear may move longitudinally of said shaft. The other bracket 89, as shown by Fig. 4, rotatably supports a nut 91 in engagement with the transverse screw threaded shaft. As shown the block 79 and pins 81 are provided for clutching the nut 91 to the bracket 89, this construction being similar to that described in connection with the correspondingly numbered clutch parts associated with the members 33 and screw threaded shafts 55 and 70. As shown (see Figs. 1, 3, 4 and 6) the members 29 at the front and back of the machine as viewed in Fig. 1 each rotatably support a rock shaft 93 provided at each end thereof with a handle lever 95, which levers by means of links 97 operate the bifurcated clutch shifting members 99 pivotally supported at 101 by the end members 29. Herein the clutch shifting mechanism is duplicated at each end of the machine and the rock shafts extend from one mechanism to the other so that the clutches on the pair of shafts 68 and 73 and on the pair of shafts 59 and 49 may be thrown simultaneously.

Referring particularly to Figs. 1, 4 and 5, carried by the end members 33 at the front of the machine, as viewed in Fig. 1, is a slidable rod 103 for actuating the clutch member 105 cooperating with the bevel gears 66 at the left hand end of the shaft 63. This construction is best shown by Figs. 4 and 5. It will be observed from Fig. 4 that the shaft 63 extends through both gears 66, which gears are loosely mounted thereon, and that the clutch member 105, which is of a known common form, is mounted between said gears, said clutch member being splined to the shaft so as to rotate therewith and to be adapted to be locked with either the right or left hand gear 66, this construction affording a well known means for reversing the direction of rotation of the shaft 68 which has fixed thereto the bevel gear 67 meshing with both gears 66. As shown (Fig. 5) the clutch member 105 is adapted to be shifted by means of the handle lever 109 which is mounted on a rotary shaft 111 carried at opposite ends in brackets 113 fixed to the adjacent transverse member 7 of the main frame.

As shown the shaft 111 slidably carries a spiral gear 115, which gear is held between the halves of a split bracket 117 fixed to the adjacent member 29 so that when said member 29 is slid on the associated bars 27 the gear 115 will be moved along the shaft 111, a spline 119 being provided for causing the gear when rotated to rotate the shaft 111 and operate the clutch member 105. Meshing with the gear 115 is a spiral toothed rack 121 carried on the sliding rod 103 which is slidably supported in projections 125 on the members 29 and 33, said bar 103 having adjustable stop collars 127 adapted to be struck by the projection on the member 33, which when struck moves the rack and by means of the spiral gear 115 rotates the shaft 111 to move the clutch member 105 into neutral position.

The bracket 117 as shown also slidably carries a spiral toothed rack 129 meshing with the spiral gear 115, through which rack slidably extends a rod 131 fixedly supported at opposite ends in the brackets 113, said rod carrying the adjustable stop collars 133, by which construction the sliding of the members 29 on the transverse bars 27 causes the rack 129 to strike one or the other of the stop collars 133 and slide said rack relative to the bracket 117 and thus rotate the gear 115 to cause the clutch member 105 to be moved into neutral position.

It will be observed by the above described construction that the stops 127 and 133 and associated mechanism at the lower left hand corner of Fig. 4 provide means for limiting the longitudinal and transverse travel of the members 33 at that corner of the machine. As will be obvious, by extending the rod 103 to the lower right hand corner of the machine and there duplicating the mechanism at the opposite corner of the machine, the members 33 at the lower right hand corner will be effective to operate the clutch 105 at the left hand end of the shaft. This construction will permit that member 33 of those at the front of the machine which first reaches its limit of travel to throw the clutch 105 at the left hand end of the shaft 63 into neutral position. By duplicating at the rear of the machine the mechanism just described the members 33 at the rear of the machine may operate upon the clutch 105 at the right hand end of said shaft to move that clutch into neutral position when the members 33 at the rear of the machine reach their limit of travel.

The pairs of members 33 slidable on the longitudinally extending guide rods 31 support polishing disks 135 of any suitable construction. As each polishing disk is supported in a similar manner, only one of the supporting means will be described. Referring particularly to Figs. 7 to 12 each member 33 is provided with a boss 137 the exterior surface of which is cylindrical and is coaxial with the screw threaded shaft for moving the members. On the cylindrical surfaces of the bosses 137 is supported a box 139 which may be adjusted into different angular positions relative to the members 33 by means of worm 141 the shaft of which is rotatably supported in lugs 143 carried by one of the members 33, said worm cooperating with a worm wheel segment 145 fixed to the box 139. As shown the member 133 adjacent the worm wheel segment is provided with an arcuate slot 147 through which extends a bolt 149, the latter being tapped (Fig. 11) into the box 139 so that the box may be securely clamped in the position to which it is adjusted by means of the worm 141. As shown a hand-wheel 151 is provided for turning the worm 141.

As shown the box 139 carries a motor 153 which through a change speed gearing, the casing of which is indicated at 155, and a chain 157 and cooperating chain sprockets 158, drives a shaft 159 journalled in the box 139. At one side of the box the shaft 159 is provided with a bevel gear 161 meshing with a bevel gear 163, the latter being splined at 164 to the spindle 165 for the polishing head 135. As shown the spindle 165 is rotatably mounted in a slide 167 mounted in guides 169 on the box, the base 171 of said guides being journalled on a sleeve 173 formed integrally with the box concentrically with the shaft 159. Also journalled on the sleeve 173 is a worm wheel 175 which by means of pins 177 is fixed to the base 171 of the guides 169 so that when the worm wheel is rotated the guides will be similarly rotated. For turning the worm wheel 175 a worm 179 is provided, said worm having a hand-wheel 183 and being mounted for rotation in lugs 181 formed integrally with the box. The base 171 for the guides is formed with arcuate slots 185 through which extend clamping bolts 187 tapped into the box, these bolts providing that the guides may be clamped securely in the position to which they are adjusted by means of the worm.

The bevel gear 163 which drives the spindle 165, and which is splined to said spindle, is shown as held in position relative to the bevel gear 161 by thrust bearings 189 and 191, the former of which is carried by the guides 169 and the latter of which is formed integrally with the base 171 of said guides. Herein the thrust bearing member 189 is provided with a tapped perforation 193 through which extends a screw threaded rod 195 journalled at 197 in an arm 199 integral with and extending outward from the upper end of the slide 167, said rod 195 having fixed thereto at its end above said arm a bevel gear 201 the hub of which gear rests on said arm. The gear 201 meshes with a bevel gear 203 fixed to a shaft 205 journalled on the arm 199, said shaft carrying a hand-wheel 207 whereby it may be rotated to cause the screw 195 to be turned, which will cause the slide to be raised or lowered and the polishing head 135 to move with it.

As shown each polishing head is connected to its spindle 165 by a universal joint connection comprising the intermediate member 209 pivoted through connections relatively at right angles to the base of said head at 211 and to the spindle at 213 respectively, this universal joint permitting the polishing disk to follow irregularities in the surface of the stone operated upon. For limiting the movement of the polishing disk allowed by its universal joint connection to the spindle the latter herein carries a sleeve 215 which surrounds the universal joint connection and limits the extent of movement thereof.

It will be observed by the above construction that I have provided a main support for a plurality of stone working tools, herein exemplified by polishing disks, on which support is mounted a plurality of auxiliary supports, which auxiliary supports are slidable in two directions on the main support; also that the tool spindles, which are adjustable lengthwise thereof relative to the auxiliary supports, have in effect a universal joint connection to the auxiliary supports permitting them to be tilted in any desired direction, this universal joint connection herein existing by reason of the rotatable connection between the box 139 and the members 33 and between the box and the member 171, the latter of which carries the tool spindle.

Although I have described for purposes of illustration one particular embodiment of my invention it is to be understood that wide deviations may be made from this embodiment without departing from the spirit of the invention.

Claims:

1. A machine of the character described having, in combination, a framework, a plurality of carriages each supporting a tool and a motor, the latter for driving said tool, a second carriage upon which said plurality of carriages are mounted, a single motor, and means actuated by said motor for traversing said plurality of carriages upon said second carriage and the latter upon said framework.

2. A machine of the character described having, in combination, a framework, a plurality of carriages mounted upon said framework for movement transversely thereof, a tool-supporting carriage upon each of said first mentioned carriages, a single motor, and means actuated by said motor for moving said plurality of carriages relative to said framework and the tool-supporting carriages relative to each of said plurality of carriages.

3. A machine of the character described having, in combination, a framework, a plurality of carriages mounted upon said framework for movement transversely thereof, each of said carriages having mounted thereon a plurality of tool-supporting carriages, a single motor, and means actuated by said motor for moving said tool-supporting carriages relative to the first mentioned carriages and the latter relative to said framework.

4. A machine of the character described having, in combination, a framework, a plurality of carriages each supporting a tool and a motor, the latter for driving said tool, a second carriage upon which said plurality of carriages are mounted, a single motor, and means actuated by said motor for selectively traversing said plurality of carriages upon said second carriage and the latter upon said framework.

5. A machine of the character described having, in combination, a framework, a plurality of carriages mounted upon said framework for movement transversely thereof, a tool-supporting carriage upon each of said first mentioned carriages, a single motor, and means actuated by said motor for selectively moving said plurality of carriages relative to said framework and the tool-supporting carriages relative to each of said plurality of carriages.

6. A machine of the character described having, in combination, a framework, a plurality of carriages mounted upon said framework for movement transversely thereof, each of said carriages having mounted thereon a plurality of tool-supporting carriages, a single motor, and means actuated by said motor for selectively moving said tool-supporting carriages relative to the first mentioned carriages and the latter relative to said framework.

7. A machine of the character described having, in combination, a framework, a plurality of carriages each supporting a tool and a motor, the latter for driving said tool, a second carriage upon which said plurality of carriages are mounted, a single motor, and means actuated by said motor for selectively and independently of each other traversing said plurality of carriages upon said second carriage and the latter upon said framework.

8. A machine of the character described having, in combination, a framework, a plurality of carriages mounted upon said framework for movement transversely thereof, a tool-supporting carriage upon each of said first mentioned carriages, a single motor, and means actuated by said motor for selectively and independently of each other moving said plurality of carriages relative to said framework and the tool-supporting carriages relative to each of said plurality of carriages.

9. A machine of the character described having, in combination, a framework, a plurality of carriages mounted upon said framework for movement transversely thereof, each of said carriages having mounted thereon a plurality of tool-supporting carriages, a single motor, and means actuated by said motor for selectively and independently of each other moving said tool-supporting carriages relative to the first mentioned carriages and the latter relative to said framework.

In testimony whereof, I have signed my name to this specification.

PETER S. LEGGE.